Figure 1:
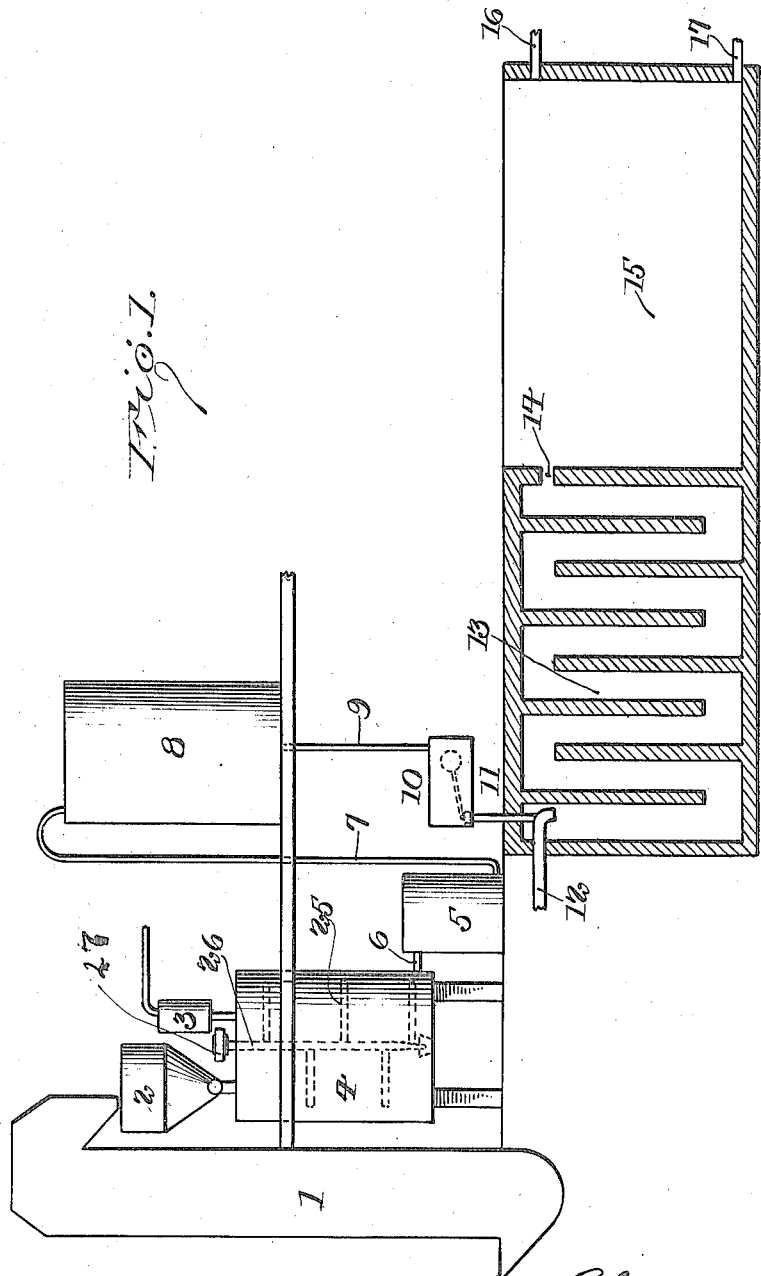

C. P. HOOVER.
PROCESS OF PURIFYING WATER.
APPLICATION FILED JULY 11, 1916.

1,197,123.

Patented Sept. 5, 1916.
2 SHEETS—SHEET 2.

Witness
George G. McDaniel

Inventor
Charles P. Hoover.
By A. M. Houghton
his Attorney

UNITED STATES PATENT OFFICE.

CHARLES P. HOOVER, OF COLUMBUS, OHIO.

PROCESS OF PURIFYING WATER.

1,197,123.

Specification of Letters Patent.

Patented Sept. 5, 1916.

Continuation of application Serial No. 870,891, filed November 7, 1914. This application filed July 11, 1916.
Serial No. 108,596.

*To all whom it may concern:*

Be it known that I, CHARLES P. HOOVER, a citizen of the United States, residing at Columbus, in the county of Franklin and State of Ohio, have invented certain new and useful Improvements in Processes of Purifying Water, of which the following is a specification.

This invention relates to processes of purifying water; and it comprises a process wherein bauxite, halloysite or other native hydrated aluminous material containing alumina is treated with sulfuric acid and the resultant material comprising the sulfuric acid soluble and sulfuric acid insoluble constituents is added to the water to be purified, advantageously after a dilution with a certain amount of water, with the result of forming a gelatinous coagulating precipitant containing aluminum hydroxid, $Al_2(OH_3)$, which has as a nucleus the sulfuric acid insoluble constituents of the native ore; all as more fully hereinafter set forth and as claimed.

It has been customary in treating water, to use what is commonly known as "alum cake". This alum cake is aluminum sulfate and is made from bauxite by digesting it with sulfuric acid in a lead lined tank, allowing the mixture to settle usually for a day or two, withdrawing the supernatant liquid containing the sulfuric acid soluble constituents of the bauxite, filtering out any suspended matters, evaporating the filtered solution, and crystallizing the resultant product. The relative amounts of acid and of alumina are such as to give a substantially chemically neutral solution; that is a solution containing sulfuric acid and alumina in the ratio $3SO_3:Al_2O_3$.

In the use of alum cake in purifying water, it is known that the more basic the material, the better it works; that is, the larger the ratio of $Al_2O_3:SO_3$, the better is its operation in purifying water. This is for a number of reasons. The alumina, $Al_2O_3$ is the active agent and the sulfuric acid is, so to speak, merely a solvent. But it is difficult in a commercial way to make an alum cake which is much more basic than the normal ratio of alumina to sulfuric acid in the neutral sulfate $(Al_2O_3, 3SO_3)$. These difficulties reside in the insolubility of the basic sulfates, the difficulty of procuring a clean crystalline product readily redissolving in water to a clear solution, etc. It is substantially impossible in the usual processes of dissolving, settling, filtering, or otherwise clarifying and evaporating, to have any substantial excess of alumina over the amount necessary for the neutral sulfate $(Al_2(SO_4)_3)$ accompany the material forward; this being true not only of alumina which has not combined with the acid but also of alumina combining with acid to form the less soluble or insoluble sulfates. In the case of these latter compounds in so far as they go into solution during digestion, on dilution the basic alumina is apt to hydrolyze quickly, become insoluble and be lost with the insoluble residue remaining after digestion; a residue which is always discarded in making the commercial sulfate. But, as stated, the more basic alums are better than the neutral salt. With them, the flocks or coagulants form more rapidly and are much larger than is the case with neutral alums. This is true with clear hard water, with a soft water moderately clear, and with a highly colored water. In commercial use, the specifications for filter alum in this country now substantially universally require that it shall be somewhat basic; that it shall contain several per cent. of alumina in excess of the amount theoretically necessary to combine with the sulfuric acid present to form the chemically neutral aluminum sulfate.

As stated, the function of the sulfuric acid is really only that of a solvent; it is something to get the alumina into solution and when the material is added to the water to be purified in the liquid form, it is expected that the carbonate of lime in the water shall combine with this sulfuric acid, settling free the alumina; the hydrated alumina being the active agent in clarification. If the water does not contain enough base to combine with the amount of sulfuric acid in the amount of sulfate of alumina necessary to be added, more base must be, and is, supplied as soda or lime. It is evident, therefore, that so far as the demands of water purification are concerned, the less sulfuric acid there is present, that is the more basic the alumina sulfate is, the better. The sulfuric acid in the large amount used in the ordinary process of manufacture is a necessary evil; there must be a relatively large amount of sulfuric acid present in order to make the filter alum or sulfate of alumina in the process of manufacture.

It is an object of this invention to reduce the amount of sulfuric acid used, thereby not only economizing in an expensive material but having less sulfuric acid to get rid of in water purification and producing a much better type of clarification.

In the old process of making filter alum from bauxite, as stated, it was the effort to use theoretically combining proportions of alumina and of sulfuric acid with perhaps a little excess of alumina so as to make the sulfate of alumina as basic as the process would stand for. In so doing the extra base over and above that which went into solution separated as a sludge, together with a certain amount of the sulfuric acid used and carried down as a basic salt together with the acid insoluble materials. This sludge was discarded. This wasted sludge contained not only alumina and sulfuric acid, so that its production was a source of loss, but it also contained some iron oxid, hydrated silica, aluminum silicate (clay), silica, titanium oxid, etc. But I find this sludge is itself a useful adjunct to the sulfate of alumina in water clarification; and so much so that I ordinarily purposely add to its amount by cutting down the amount of acid somewhat. The reduction in the amount of acid not only gives me a more basic material which is desirable, but also gives me more sludge.
My invention is relatively simple and inexpensive as compared with the heretofore known processes of clarifying water with the filter alum above described, and it results in the possibility of use of a comparatively greater per cent. of basic alumina, as well as of the silica and silicates, iron, alumina and titanium oxids and other materials useful for coagulating and clarifying water, all of which I term sulfuric acid insoluble constituents of the native hydrated material used. And there is no waste of sulfuric acid; but, on the other hand, all the sulfuric acid which I use is utilized and I am enabled to employ the minimum necessary for the present purposes.

According to my invention, I treat bauxite with sulfuric acid and then add the resultant product directly to the water without sedimentation or filtration. Ordinarily
I employ considerably less sulfuric acid than is chemically equivalent to the alumina and other bases present. For example, for 100 parts by weight of bauxite containing 52 parts of available or acid soluble alumina, I may use 139 parts by weight of ordinary 66° sulfuric acid. The sulfuric acid may be diluted with 1 to 70 parts of water, the bauxite added and the mixture stirred without external heating until reaction appears to be complete. The product obtained contains undecomposed bauxite, the oxids above mentioned, and basic alumina, (all of which are lost in the processes heretofore known) in addition to the neutral and basic sulfates of alumina in solution. This material is quite basic; it contains a higher percentage of dissolved alumina in proportion to the sulfuric acid than can be obtained from a material which has been reduced to dryness upon subsequent treatment with water. The whole material thus produced is used for treating water and in this treatment the presence of the undecomposed bauxite and other insoluble matters serve as a matrix to start the coagulation. The presence of the high percentage of basic alumina hastens the coagulation. It has coagulative properties in and of itself, that is, it does not depend as does the neutral sulfate, upon the action of bases to form coagula, and it causes the flocks to be larger.

In the accompanying drawing I have shown more or less diagrammatically apparatus capable of performing my process.

Figure 2:
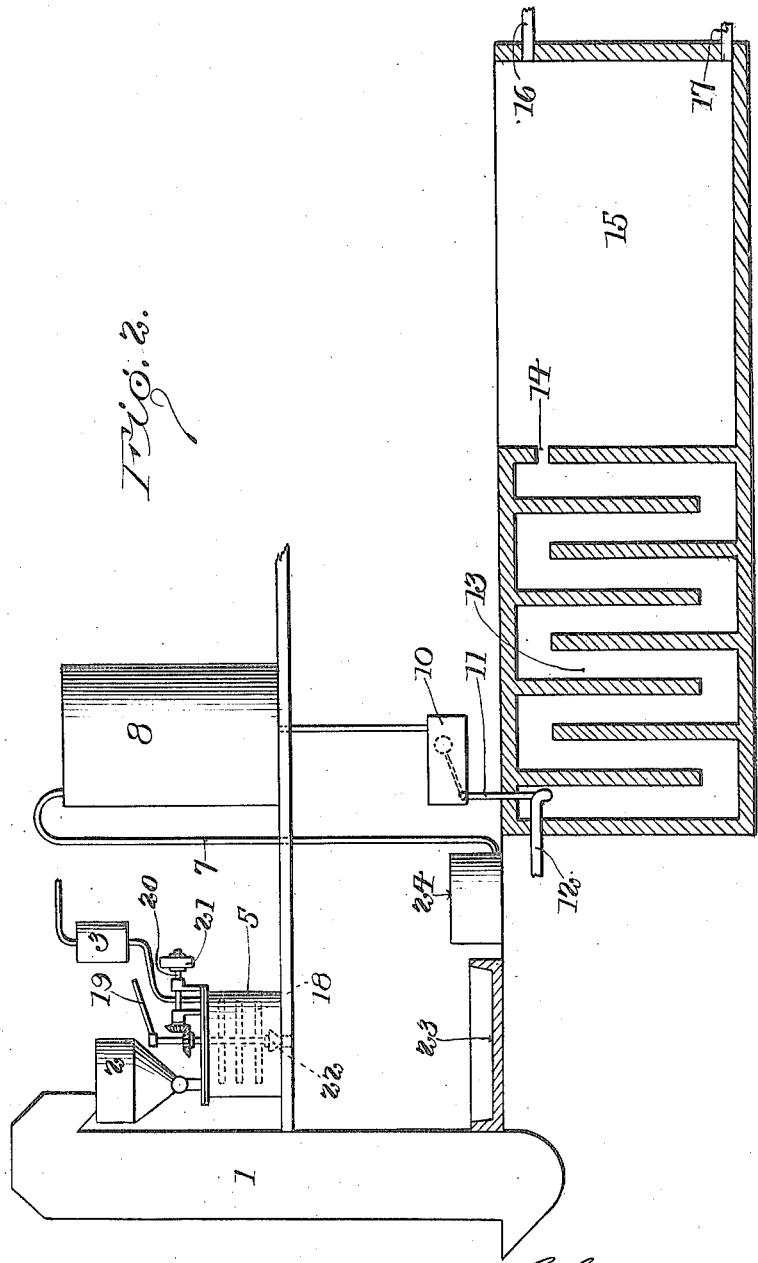

Figure 1 is a diagrammatic illustration, partly in elevation and partly in section of one form of apparatus; and Fig. 2 is a similar view of a slightly modified form.

In the drawings, 1 indicates an elevator, 2 a weighing hopper, 3 an acid measuring tank, 4 a lead-lined boiling tank, 5 an alum measuring tank in communication with the lead tank by means of pipe 6, 7 a pipe leading from the alum tank to the chemical solution tank 8, 9 a feed pipe leading to the chemical feed regulator 10, 11 a pipe leading to the water main 12, 13 a mixing tank through which the water and the solution flow, 14 a water overflow from the mixing tank, 15 a sedimentation basin, 16 the overflow or pump suction and 17 a sludge drain. I may use agitator 25 in tank 4 under certain conditions on shaft 26 operated by pulley 27.

In Fig. 2 the same reference characters designate parts corresponding to those of Fig. 1. However, in this view the tank 5 is provided with stirrer 18 operated through bevel gears 19 on shaft 20 provided with pulley 21, and this tank 5 may have the outlet or plug valve 22 feeding material into a solidifying pit 23 where the material remains for a short while and solidifies.

While in this pit 23 water is evaporated off by the heat of reaction between sulfuric acid and water and the material may become solid but it is noted that such solid material contains everything but the water originally present; there is no elimination of any of the impurities. In other words no filtration or sedimentation step is employed. 24 is a dissolving tank, adjacent the solidifying pit 23 where water may be added if necessary. From this dissolving tank material in solution and suspension is conveyed by pipe 7 to the chemical solution tank 8. From this stage the apparatus used is similar to that in Fig. 1.

I may use either the apparatus of Fig. 1 or of Fig. 2.

Referring to the drawings, and particularly Fig. 1, finely pulverized bauxite is carried by elevator 1 into weighing hopper 2 and sulfuric acid is measured in tank 3 and discharged into the lead-lined "boiling tank" 4. Water is then added and the heat of reaction between the water and acid causes the mixture to become hot. I may however use heating means for tank 4 if desired. Pulverized bauxite is fed slowly from the weighing hopper 2 into the hot acid solution and the reaction is allowed to continue from 3 to 4 hours, usually without any external heat. Subsequently it is usually necessary to boil the solution in tank 4 by means of steam coils or live steam for several hours longer to complete the reaction to the desired extent. After this boiling process is completed the tank 4 is filled with water and the mixture is thoroughly agitated by means of air or paddles. After the mixture is thoroughly agitated a portion is discharged through pipe 6 into measuring tank 5, and then ejected through pipe 7 into chemical solution tank 8. In tank 8 the mixture is further diluted and it is discharged by pipe 9 into a chemical feed regulator of any ordinary type whence it passes by pipe 11 to the water main 12. The water thus treated is caused to circulate through the mixing tank 13 where coagulation takes place and is discharged through water overflow 14 to sedimentation basin 15 where it is allowed to settle. The clear water is drawn off from the pump suction or overflow 16 while the sludge precipitated from the water (containing the sludge, which was introduced into the water by the alum solution) and which has settled to the bottom of sedimentation basin 15, is discharged through the sludge drain 17.

The apparatus of Fig. 2 differs slightly from that of Fig. 1. The bauxite and acid are stirred together in tank 4 by means of the plates 18 operated through the gears 19, shaft 20 and pulley 21. After being mixed for about 5 or 10 minutes the mixture is discharged through the plug valve 22 into solidifying tray or pit 23. In this solidifying pit the mixture boils violently and on cooling forms a hard cake, which cake contains all the original constituents. The cake is dug from the pit 23 and a part is dissolved and disintegrated in dissolving tank 24, and then ejected through pipe 7 into chemical solution tank 8, where it is diluted with water and used in exactly the same manner as in the process just described.

Among the advantages of my process are the following: It uses the sludge or insoluble material of the alum syrup as well as what may be termed the semi-soluble or basic material as well as the normal or neutral sulfate. In heretofore known processes part of the available alumina and particularly the basic alumina is lost. In my process all of the alumina content is effective and utilized. In my process I do not try to separate the alumina sulfate from the undissolved material but allow all this material to remain in suspension and use both it and the normal sulfate formed in the action. Further I lose absolutely none of the alumina.

A further advantage of my process is that I produce and use highly basic forms of alumina sulfate and such compounds are less stable than the firmly combined alumina of the normal sulfate and consequently disassociate very quickly. This is a decided advantage because in the treatment of water it is very often found difficult to start coagulation; especially in treatment of cold water. Water works' operators have experienced at times considerable difficulty in this regard. The present basic material has the advantage in that it reacts more readily and more quickly as compared with the materials used in the old process.

Another decided advantage in this process is that it is cheaper since less sulfuric acid is required for the manufacture. Theoretically, 161 parts of 66° Bé. acid should give a substantially neutral solution, that is, a solution containing sulfuric acid and alumina in the ratio of $3SO_3:Al_2O_3$. As stated, in my process I can use 52 parts of available or acid soluble alumina to as low as 139 parts of 66° sulfuric acid.

When the mixture is added to a hard water, the sulfuric acid present combines with the lime and magnesia of the water, setting free alumina in gelatinous form. The sludge or residue of the material already contains some gelatinous alumina. The whole insoluble materials of the mix, that is, those materials which were not affected by the sulfuric acid, the semi-converted insoluble materials and the gelatinous alumina already present, as well as that formed by the interaction of the neutral and basic sulfates of alumina of the solution with the basic bodies of the water, all co-operate in producing a highly efficient clarification; and this clarification is effected, as it is found, with considerable less material than where commercial substantially neutral filter alum is employed. And there is not the same necessity of adding additional base. The wholly insoluble materials of the mixture, such as sand, iron oxid, etc., assist the impurities of the water in forming nuclei for the separation of the gelatinous alumina, not only that produced by the interaction of the constituents of the water but that already present and assist in forming larger, better settling coagula and flocks with a resultant better separation of the mud and dirt in the water. This assistance is particularly useful in the case of rather clear waters containing very little insoluble material adapted to act in this nucleus manner.

This application is a continuation of my prior application, Serial No. 870,891, filed Nov. 7, 1914.

What I claim is:—

1. The process of treating water which comprises mixing sulfuric acid and native hydrated aluminous material to form a composition comprising aluminum sulfates and sulfuric acid-insoluble constituents of the material, adding such composition directly to the water to be purified and thereby forming aluminum hydrate, settling such aluminum hydrate together with entrapped impurities and the initial sulfuric acid-insoluble constituents, and drawing off the purified water for use.

2. The process of treating water which comprises mixing sulfuric acid and bauxite to form a composition comprising aluminum sulfate and sulfuric acid insoluble constituents of bauxite, adding such composition directly to the water to be purified and thereby forming aluminum hydrate, settling such aluminum hydrate together with entrapped impurities and the initial sulfuric acid insoluble constituents, and drawing off the purified water for use.

3. The process of purifying water which comprises treating native hydrate aluminous material with sulfuric acid in quantity sufficient to make a composition containing basic sulfates and sulfuric acid insoluble constituents of the material, adding such composition to the water to be purified, thereby forming aluminum hydrate, settling such aluminum hydrate together with entrapped impurities and the sulfuric acid insoluble constituents of the original material, and drawing off the purified water for use.

4. The process of purifying water which comprises treating native hydrated aluminous material with sulfuric acid in such proportion as to form basic sulfates containing the initial impurities of the native material, diluting the same with water, adding the resultant solution to the water to be purified and thus forming aluminum hydrate, settling the said aluminum hydrate together with entrapped impurities and together with the initial impurities of the native material, and drawing off the purified water for use.

5. The process of purifying water which comprises adding thereto a magma containing the sulfuric acid soluble and insoluble constituents of native hydrated aluminous material, allowing the material to form coagulants comprising aluminum hydrate and the said sulfuric acid insoluble constituents of the native material, settling the said coagulants, and drawing off the purified water for use.

6. The process of purifying water which comprises treating native hydrated aluminous material with sulfuric acid to form a substance containing aluminum sulfates and sulfuric acid insoluble constituents of the material, allowing the substance to solidify, adding water to a portion of the substance to form a magma containing sulfuric acid soluble and sulfuric acid insoluble constituents of the native material, adding the magma thus formed to the water to be purified, settling the aluminum hydrate formed together with entrapped impurities and the sulfuric acid insoluble constituents of the magma, and drawing off the purified water for use.

7. The process of purifying water which comprises treating bauxite with sulfuric acid and water to form a substance containing aluminum sulfates and sulfuric acid insoluble constituents of bauxite, allowing the substance thus formed to solidify, adding water to a portion of the substance to form a magma containing sulfuric acid soluble and sulfuric acid insoluble constituents of the bauxite, adding the magma thus formed to the water to be purified, settling the aluminum hydrate formed together with the entrapped impurities and the sulfuric acid insoluble constituents of the magma and drawing off the purified water for use.

8. In the purification of water the process which comprises adding thereto a magma containing the sulfuric acid soluble and the sulfuric acid insoluble constituents of native hydrated aluminous material.

9. In the purification of water the process which comprises adding thereto a magma containing the sulfuric acid soluble and sulfuric acid insoluble constituents of bauxite.

10. The process of purifying water which comprises adding thereto a magma containing the sulfuric acid soluble constituents of native aluminous material together with certain sulfuric acid insoluble constituents of the native aluminous material consisting of titanium oxid, iron oxid, clay and sand.

11. The process of purifying water which comprises adding thereto a magma containing the sulfuric acid soluble constituents of bauxite together with a mixture of sulfuric acid insoluble constituents comprising titanium oxid, iron oxid, clay and sand.

In testimony whereof, I affix my signature hereto.

CHARLES P. HOOVER.